June 26, 1928.
R. A. JORDAN
INCUBATOR
Filed March 26, 1923
1,675,105
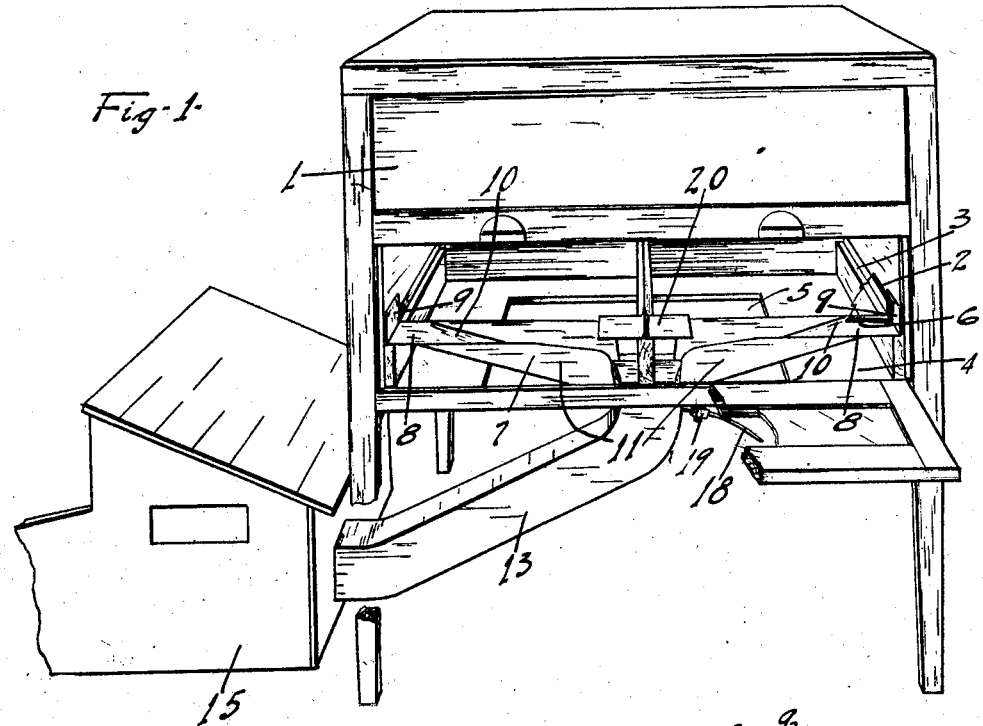
Fig-1-
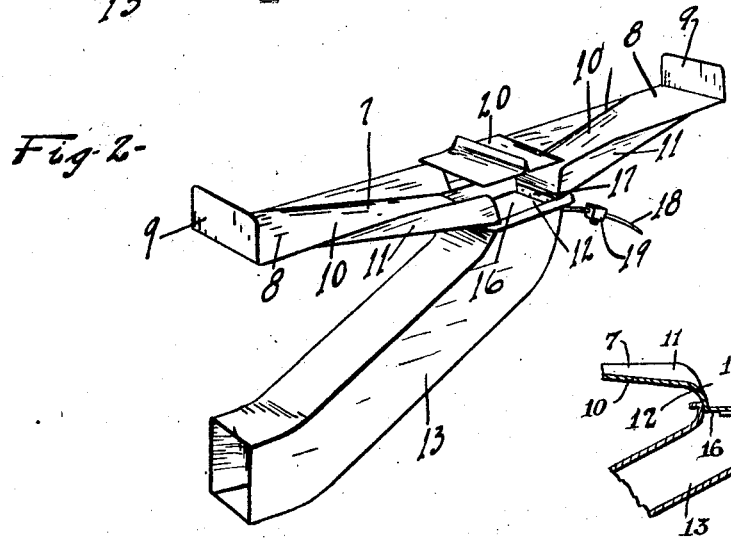
Fig-2-
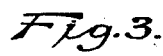
Fig-3.
Roy A. Jordan
INVENTOR
BY
ATTORNEY Patented June 26, 1928.

1,675,105

UNITED STATES PATENT OFFICE.

ROY A. JORDAN, OF ERIE, PENNSYLVANIA.

INCUBATOR.

Application filed March 26, 1923. Serial No. 627,615.

This invention is intended to improve incubators by providing them with means by which the chicks as they are hatched are taken from the incubator and immediately delivered to a brooder so that the incubator is relieved of the disturbance of the hatched chicks, thus improving the action of the incubator and serving to better safeguard the chicks.

The invention is illustrated in the accompanying drawings as follows:—

Fig. 1 shows a perspective view of an incubator with my device in place thereon.

Fig. 2 a perspective view of the detached chute, through which the chicks are passed.

Fig. 3 is a central sectional view through a part of the chute.

1 marks the incubator chamber. This has the usual egg tray 2 which is carried by the slides 3. The incubator bottom 4 forms the usual brooder space. This has the usual sand tray 5. The egg tray is provided with the usual opening 6 at its front through which the chicks usually drop to the brooder space.

I provide a chute 7. This has the flattened plates 8 with the upturned ends 9 which form a continuation of the slides 3 so that they are locked in place by the egg tray but do not prevent the movement of the egg tray in and out of the incubator. The chutes 7 have the inclines 10 which extend downwardly toward the center with the side walls 11 and these inclines terminate in an opening 12 which extends through the bottom of the incubator. A closed chute 13 is secured to the bottom of the incubator and the lower end of this chute opens into a brooder coop 15. A trap door 16 is arranged in the opening 12 and normally closes it against a disturbing passage of air. The door is hinged at 17 and has an outwardly extending balancing rod 18 on which an adjustable weight 19 is secured. The weight is so adjusted that the door will readily open under the weight of the chick but will automatically close as soon as the chick passes through. I prefer to provide a cover plate 20 immediately over the opening so as to prevent a direct downward drop of the chick to the deeper part of the chute.

The operation of the device will be readily understood. As soon as the chick hatches and begins to move it usually works its way to the opening in the egg tray, this opening being toward the light and drops into the inclined chutes. These chutes are sufficiently smooth so that the chick slides through these chutes through the door and to the bottom of the chute 13 which brings it to the opening to the brooder.

What I claim as new is:—

1. In an incubator, the combination with an incubator chamber; an egg tray in the chamber having an opening through its front edge; and a double chute leading from each side of the opening to the center, said chute leading to without the incubator.

2. In an incubator, the combination with an incubator chamber; an egg tray in the chamber having an opening through its front edge; a double chute leading from each side of the opening to the center, said chute leading to without the incubator; and an automatically closing door at the junction of the chutes adapted to open under the weight of a chick.

3. In an incubator, the combination with an incubator chamber; egg tray slides therein; an egg tray in the slides; a chute having a bend conforming to the slide, the egg tray operating on the bends to hold the chute in place, said chute extending from the tray; and an incline through which the chick slides to without the incubator.

4. In an incubator, the combination with an incubator chamber; egg tray slides therein; an egg tray in the slides; a chute having a bend conforming to the slide, the egg tray operating on the bends to hold the chute in place, said chute extending from the tray; an incline through which the chick slides to without the incubator; and an automatically closing door along the chute opened by the weight of the chick.

5. In an incubator, the combination of an incubator chamber; a brooder separate from the incubator chamber and having its walls independent thereof; and a passageway normally unobstructed to the passage of a chick leading from the incubator chamber to the brooder, said passage-way having an inclination assuring a downward and outward movement of the chick from the incubator chamber to the brooder as the chick is hatched.

In testimony whereof I have hereunto set my hand.

ROY A. JORDAN.